INVENTORS
WILLIAM J. CLAYTON
ROBERT J. MILLER
CLAIR C. SMITH

ATTORNEY

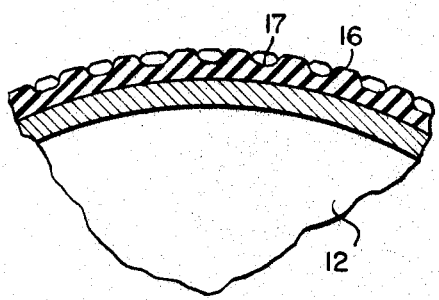
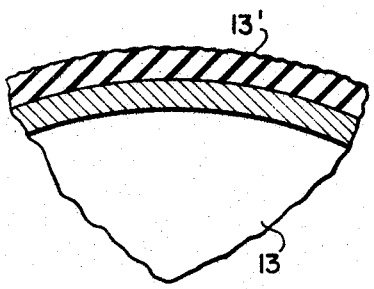
FIG. 2    FIG. 3
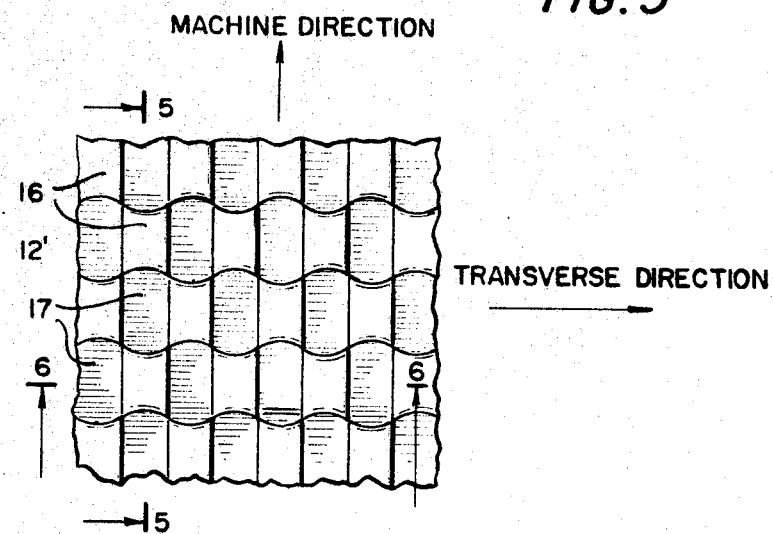
FIG. 4
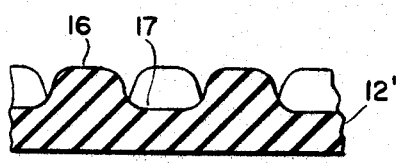
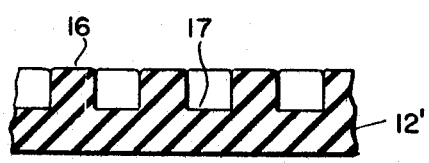
FIG. 5    FIG. 6

July 23, 1968 W. J. CLAYTON ET AL 3,393,861
EMBOSSED THERMOPLASTIC BAGS
Filed Nov. 29, 1966 3 Sheets-Sheet 3
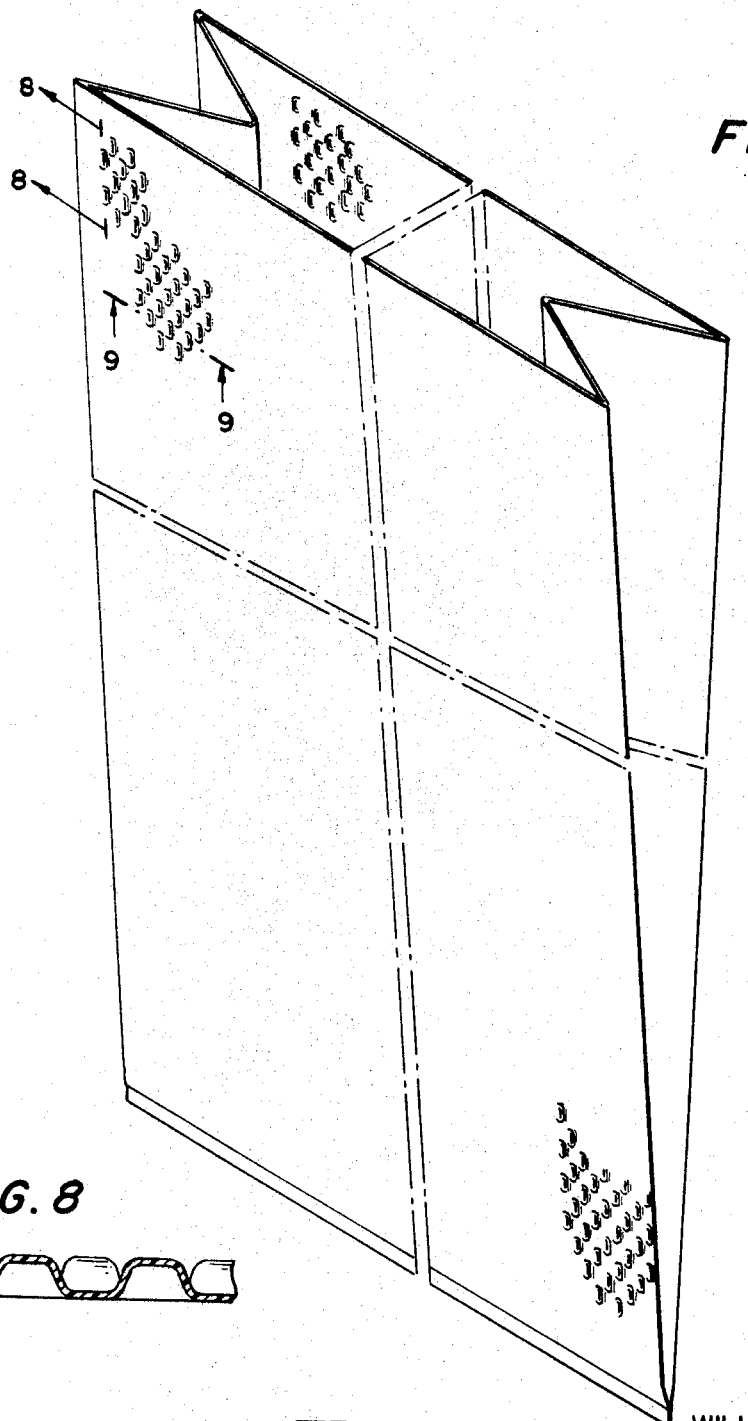
FIG. 7
FIG. 8
FIG. 9
INVENTORS
WILLIAM J. CLAYTON
ROBERT J. MILLER
CLAIR C. SMITH
BY
ATTORNEY

United States Patent Office 3,393,861
Patented July 23, 1968

3,393,861
EMBOSSED THERMOPLASTIC BAGS
William J. Clayton, Fairport, and Robert J. Miller and Clair C. Smith, Holcomb, N.Y., assignors to Mobil Oil Corporation, a corporation of New York
Filed Nov. 29, 1966, Ser. No. 597,791
1 Claim. (Cl. 229—53)

ABSTRACT OF THE DISCLOSURE

An embossed bag of thermoplastic material comprising a seamless tube of thermoplastic film transversely sealed along one of its open ends. The embossments are formed with a plurality of rectangular projections having edges which are angular in a direction perpendicular to the transverse seal and rounded in a direction parallel to said seal. Ease of opening of the bag structures is facilitated by virtue of the specific configuration of the rectangular embossing projections.

---

The present invention relates to tubular bag structures of thermoplastic material and particularly to tubular bag structures which carry an embossed pattern on the surface thereof, which pattern facilitates ease of opening of the bag structures.

As used herein the term "embossed" means broadly, a raised surface, i.e. a surface which extends, at points, above and/or below the normal surface level of the thermoplastic sheet.

In the past a wide variety of methods and apparatus have been employed to produce embossed thermoplastic films with varied types of patterns or textures being imparted to the film surface. For example, such embossment has been accomplished by subjecting a single layer of film to be embossed to the application of heat and pressure while passing it through the nip formed by a pair of contra-rotating rollers, the surface of said rollers carrying the pattern desired to be impressed upon the film. In addition to the employment of matched or mated rollers, other embossing techniques used in the past include passing a thermofilm through an embossing zone comprising a pair of rollers, one of which carries depressions and/or elevations on the surface thereof in a predetermined pattern, and the other roller being characterized by having a flat, smooth, resilient surface.

The aforediscussed prior art techniques employed to produce embossed thermoplastic films have been found to be effective when only a single layer of film is to be embossed. In the case where multiple layers, e.g. a flattened tube consisting of two layers of thermoplastic film, are employed as the starting material, it has been found that the requisite conditions of pressure and temperature to achieve a permanent embossment on the surface of the film layer are such that they result in the film layers being blocked or sealed together after they emerge from the embossment zone. In the case where it is desired to separate these layers for subsequent processing of the film tube, for example to reinflate such a tube to form gussets in the longitudinal edges thereof for the employment of such a tube in bag-making operations, this blocking together of the film layers either inhibits or completely prohibits reinflation of the film tube. Attempts to remedy this blocking together of the film layers by regulating, i.e. reducing, requisite temperature and/or pressure to achieve embossing, results in an embossment which is not permanent, that is, the definition of the embossments on the film surfaces becomes undesirably faint and often barely discernible upon reinflation of the film and subsequent processing of the tube structure, for example during a bag-making operation.

The process of the present invention provides a low temperature, low pressure method for the production of embossed tubular thermoplastic films which comprises passing a flattened tube of thermoplastic film through the nip formed by a pair of contra-rotating embossing rollers, one of said rollers comprising a heated, smooth, resilient surfaced roll and the other of said rollers comprising a patterned surface, compression or embossing roll. The configuration of the pattern on the surface of the embossing roll is specially designed to avoid interlayer blocking of the tube after passing through the embossment zone thereby allowing for ease of subsequent reinflation of the tube following the embossing step.

In particular the present invention provides a method for simultaneously embossing at least two superimposed layers of thermoplastic film by advancing superimposed thermoplastic film layers onto a rotating embossing roller having projections on the surface thereof to support the film layers. The supporting projections on the embossing roller have a film supporting surface of substantially rectangular configuration, the surface being further characterized by having edges which are angular in the direction of film advancement and rounded in the direction transverse to the direction of film advancement. Heat and pressure are applied to said film layers while on said embossing roller by contacting said films with a heated resilient surfaced roller in nipping engagement with the embossing roller to thereby emboss the film layers. Subsequently the embossed film layers are removed from the surface of the embossing roller.

Thus, the process of the present invention results in the formation of, for example, embossed tubular thermoplastic material which may be employed to produce, for example, embossed thermoplastic bag structures. A specific embodiment of such a bag structure comprises a tubular bag of thermoplastic material. The bag is fabricated from a seamless tube of embossed thermoplastic film, one of its open ends being transversely sealed. When the preferred embossed pattern in accordance with the present invention is employed to produce bag structures, such bags are characterized in that their wall surfaces are embossed with a plurality of substantially rectangular projections. The projections have an upper surface, the edges of which are angular in the direction substantially perpendicular to the transverse bottom seal of the bag, and rounded in a direction substantially parallel to said bottom transverse seal.

The specific nature of the present invention as well as objects and advantages thereof will clearly appear from a preferred embodiment thereof as shown in the accompanying drawings in which:

FIGURE 2 is an enlarged fragmentary view in section of the surface 12' of roller 12 illustrated in FIGURE 1.

FIGURE 3 is an enlarged fragmentary view in section of the surface 13' of roller 13 illustrated in FIGURE 1.

FIGURE 4 is a plan view of a type of embossing surface 12' which may be employed in accord with the process of the present invention.

FIGURE 5 is a sectional view substantially on line 5—5 of FIGURE 4.

FIGURE 6 is a sectional view substantially on line 6—6 of FIGURE 4.

FIGURE 7 is a perspective view of an embodiment of the embossed tubular thermoplastic bag structures of the present invention.

FIGURE 8 is a cross-sectional view of the bag wall taken on line 8—8 of FIGURE 7.

FIGURE 9 is a cross-sectional view of the bag wall taken on line 9—9 of FIGURE 7.

Figure 1:
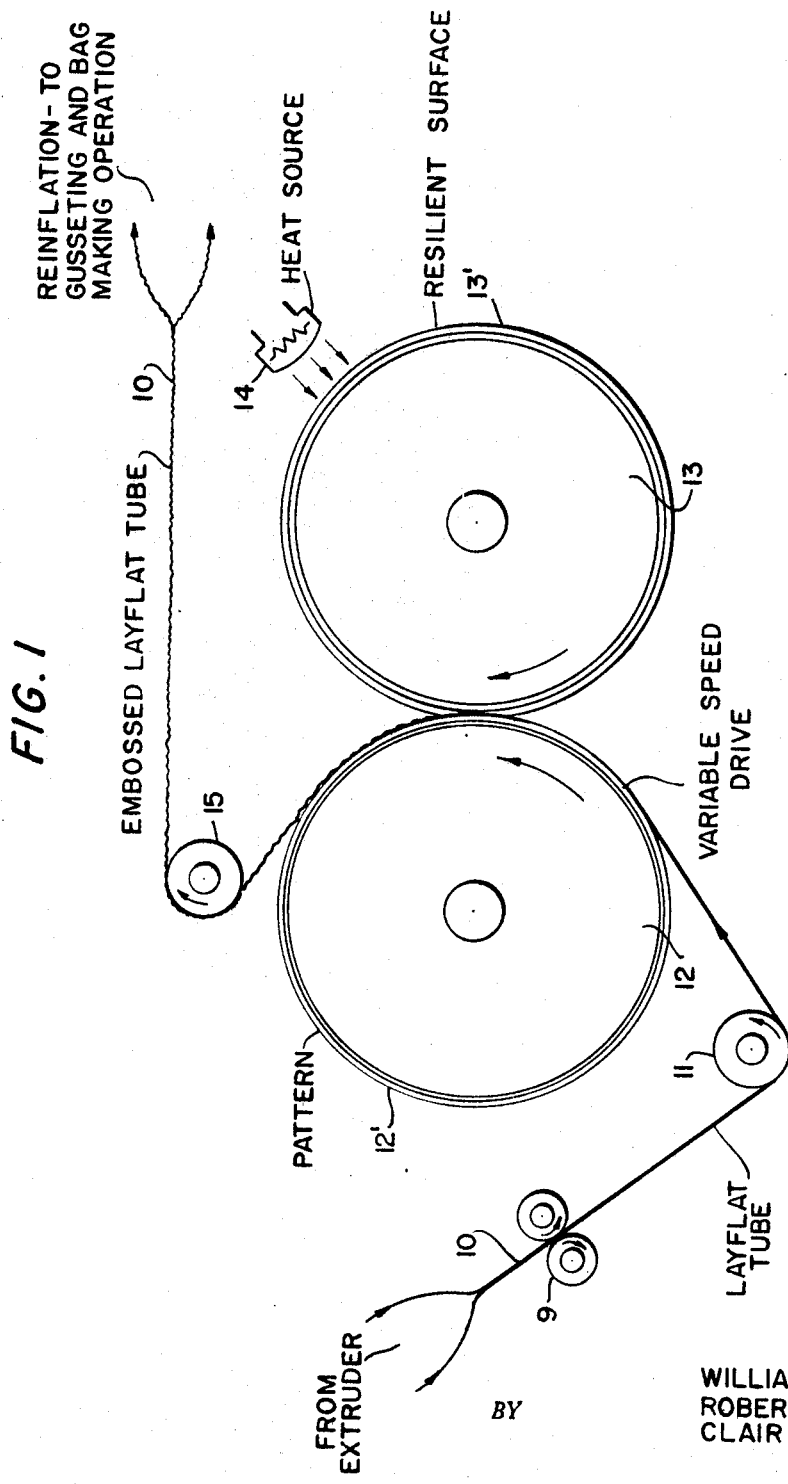
FIGURE 1 is a diagramatic view in side elevation showing an apparatus which may be employed in the novel process of the present invention.

The present invention is based in part on the discovery that thin sheets of thermoplastic films, i.e., sheets on the order of from about 0.5 to about 5.0 mils, when formed into a flattened tube can be embossed and subsequently reinflated for further processing thereof, without interlayer film blocking taking place. It has been found that the configuration of the pattern on the surface of the embossing roll if designed in accordance with the present invention will result in a process whereby a flattened tube of thermoplastic film may be permanently embossed using heat and pressure and yet allow for subsequent reinflation thereof.

Referring now to FIGURE 1, there is shown in digrammatic form, an apparatus which may be employed in the process of the present invention. This apparatus may be employed in a continuous in-line embossed tubular bag manufacturing operation, that is to say, the thermoplastic tube may be extruded, cooled, and flattened into a lay-flat tube, embossed in its lay-flat condition and subsequently reinflated for passage to gusseting and finally to the bag-making operation. As can be seen from FIGURE 1, the inflated cooled tube from the extruder is passed through a pair of contra-rotating nip rollers 9 employed to form the lay-flat tube 10. Lay-flat tube 10 passes around rotating idler roll 11, and onto the surface of embossing roller 12, which may be driven utilizing a variable speed drive (not shown), and into nipping engagement with the resilient surface of roller 13, the surface of which is heated such as, for example, by external heat source 14. Embossing roller 12 is maintained at a constant temperature utilizing fluids circulated internally thereof (not shown). As lay-flat tube 10, now embossed, passes from the nip formed by embossing roller 12 and resilient surface roller 13, it is removed from the surface of embossing roller 12 by idler roller 15 and the now embossed lay-flat tube is passed to subsequent processing steps such as reinflation, gusseting and bag-making machines.

Embossing roller 12 as hereinbefore indicated carries upon the surface thereof the desired design or pattern to be impressed upon the surface of the thermoplastic film tube. The pattern may be etched or engraved upon the surface thereof as in the case of conventional metallic embossing roller. However, it has been found desirable in the practice of the present invention to employ an embossing roller, the patterned surface of which is a poor heat conductor. It has been found that if the patterned surface is a good conductor of heat, it is difficult to apply sufficient heat to the film tube to produce embossing without applying enough to induce subsequent undesirable interlayer blocking of the embossed tube. Another requirement of the patterned surface of the embossing roller of the present invention is that the material which forms the pattern should exhibit some resiliency to avoid film rupturing and tearing during the embossing operation. A wide variety of materials may be employed in the fabrication of embossing surface 12′ such as, for example, rubber, synthetic rubber and resilient plastic materials such as vinyl for example.

The patterned surface 12′, a typical embodiment of which is more clearly illustrated in FIGURES 2, 4, 5 and 6, may comprise a series of generally rectangular projections 16 and depressions 17. It has been found that if all of the vertical sidewalls of these projections are substantially perpendicular, with the upper shoulders or edges of said projections substantially squared off at a sharp angle that the resultant embossed tubular product blocks to such an extent that the layers are substantially inseparable or blocked to such a degree as to render the tube unprocessable for further in-line bag-making operations such as, for example, re-inflation thereof for gusseting. Moreover, even if reinflation thereof were unnecessary and the ungusseted tube passed directly to a bag-making machine, the resultant bags exhibit such a high degree of interlayer blocking that manual separation of the blocked edges of the bag at its open end for filling purposes is quite difficult. Conversely, it has also been found that if all of the walls of said projections are tapered, and the upper shoulders thereof are rounded off, then the tubular structure embossed with such an embossing surface does not keep its embossment permanently but they become faint during subsequent reinflation and processing of such a tube in an in-line bag-making operation. Attempts to remedy the foregoing deficiencies by concise regulation and control of embossing temperatures and pressures were unsuccessful.

Applicant has now found that the foregoing deficiencies may be completely eliminated and a permanent embossment may be impressed into the surface of a flattened plastic tubular structure by specially designing the projections and depressions which constitute the surface of the embossing roller. It has been found that if the shoulders or upper edges of the embossing projections on the embossing pattern are rounded-off in the direction which is transverse to the direction in which the flattened tubular film is moving, see FIGURE 5; and if the shoulders or upper edges of the embossing projections are squared, i.e. at substantially a 90° angle, in the machine direction, i.e. the direction in which the thermoplastic tube is running, see FIGURE 6, then the resultant embossed tubular film exhibits a well defined, distinct, embossed pattern thereon which does not become indistinguishably faint or disappear upon subsequent reinflation of the tube and, moreover, the interlayer blocking tendency of the tube, when attempts to reinflate or reopen it are made, is completely eliminated.

Although, for illustrative purposes, the invention is hereinafter described with particular emphasis upon certain specific process conditions requisite for the embossment of a thermoplastic film such as polyethylene, the embossing method of the present invention may be employed with a wide variety of other thermoplastics. For example, other polyolefins such as polypropylene, polybutene-1 and copolymers thereof; polyvinyl chloride, polyamides, polyesters, polyvinyl acetals, rubber hydrochlorides and others may be embossed utilizing the method of the present invention.

The surface temperature of embossing roller 12 may be controlled utilizing one or more external radiant heat source means or preferably by the employment of temperature controlled fluids, such as water for example, circulating internally through the embossing roll. It has been found that the temperature of the surface of the embossing roll may vary from about 35° F. up to about 220° F. dependent upon line speeds. For example, at line speeds of about 20 ft./min., 155° F. has been found to be satisfactory surface temperature of the embossing roller whereas at higher in-line speeds, e.g. about 100 ft./min., 220° F. is a preferred surface temperature for roller 12.

Likewise, the surface temperature of heated, resilient-surfaced roller 13 may vary, dependent to some extent upon line speeds, however, the surface of roller 13 is preferably maintained within the range of from about 225° F. to about 275° F.

The pressure exerted upon the film layers to be embossed between rolls 12 and 13 at the nip thereof may vary within wide limits, however, pressures between about 5 p.s.i. and 50 p.s.i. appear to give satisfactory results in the present process and particularly pressures on the order of about 20 to about 30 p.s.i The following example is presented in illustration of a particular embodiment of the process of the present invention and accordingly should not be considered as limitative thereof.

*Example I*

A tube of polyethylene film was fabricated from commercially available polyethylene resin utilizing standard tubular extrusion techniques. After cooling it was collapsed by a pair of nip rollers 9 and advanced around the surface of spreader-idler roll 11 and into contact with the surface of embossing roller 12. The entire surface of embossing roller 12, approximately 15" in diameter, was covered with a rubber mat approximately ⅛" thick and adhesively secured thereto. The exposed surface 12' of the mat carried a design especially selected for the present embossing process and described in detail hereinafter. Embossing roller 12 was fitted to a circulating supply of hot water which was maintained at a temperature of approximately 155° F. The embossing roller was driven at a rate of 25 r.p.m. by a variable speed motor.

The surface of roller 13, approximately 9" in diameter, was covered with a ⅛" thick firm density silicone rubber sponge and was driven by contact with the embossing roll. The surface of the silicone rubber sponge carried upon the surface of roller 13 was heated utilizing a radiant heat source 14 and the surface of the sponge was maintained at approximately 225° F. by heat from this source. Lay-flat tube 10 was continually advanced upon the surface of embossing roller 12 and into the nip formed by embossing roller 12 with the resilient surface roller 12. In this embossing zone, the pressure applied to the film passing through this nip was approximately 30 p.s.i. Lay-flat tube 10, now embossed, was continued to be carried upon the surface of embossing roller 12, past the embossing nip, whereupon the film gradually began to cool before it was removed from the surface of the embossing roll by spreader-idler roll 15. The embossed lay-flat tube was subsequently passed to a gusseting operation where the tube was inflated, i.e. opened by air, for gusseting. No noticeable interlayer blocking occurred during this opening operation. Finally the gusseted, embossed tube was passed to a standard bag-making machine where embossed thermoplastic tubular bags were formed utilizing standard bag-forming operations.

The design of the embossing pattern carried on the surface of 12' of embossing roller 12 which was used in the present example is illustrated in FIGURES 4, 5, and 6 of the attached drawings. As illustrated in FIGURE 4, the pattern comprised a series of raised projections which were generally rectangular in shape. Surrounding each projection 16 are a series of depressions 17 which likewise are substantially characterized by being essentially rectangular. The upper edges of projections 16, as illustrated in FIGURE 5, were rounded on those upper edges of the projections which extend in a direction transverse to the direction of the path taken by lay-flat tube 10 as it was embossed. The upper edges of projections 16 which were disposed in a direction parallel to the direction of lay-flat tube 10 are squared-off or angular as illustrated in FIGURE 6 of the attached drawings.

Thus in accordance with the preceding example, a method has been developed for the continuous, in-line production of embossed lay-flat thermoplastic tubes, i.e. a multiple film layer embossment technique, which results in a product comprised of embossed layers which exhibit little or no interlayer blocking tendencies as a result of the requisite pressures and temperatures encountered during the simultaneous embossing thereof and accordingly which layers may be easily separated for further fabrication or processing thereof in a single layer condition.

Although the present invention has been described with preferred embodiments, resort to modifications and variations can be had without departing from the spirit and scope of the invention, as those skilled in the art will readily appreciate. Such variations and modifications are therefore considered to be within the purview and scope of the appended claim.

What is claimed is:

1. A tubular bag of thermoplastic material which comprises a seamless tube of thermoplastic film, said tube being characterized by having one of its open ends transversely sealed and a substantial area of its wall surfaces comprising an embossed pattern, said embossed pattern comprising a plurality of substantially rectangular projections having an upper surface, the edges of which are angular in the direction substantially perpendicular to said transverse seal and rounded in the direction substantially parallel to said transverse seal whereby opening of said bag is facilitated by virtue of the configuration of said projections.

References Cited

UNITED STATES PATENTS

| | | |
|---|---|---|
| 2,778,173 | 1/1957 | Taunton. |
| 2,917,223 | 12/1959 | Le Bolt et al. |
| 3,224,574 | 12/1965 | McConnell et al. ____ 229—53 X |
| 3,283,992 | 11/1966 | Hanson et al. _____ 229—53 |

DAVID M. BOCKENEK, *Primary Examiner.*